United States Patent [15] 3,671,485
Marwitz et al. [45] June 20, 1972

[54] ABHESIVE COATINGS COMPRISING POLYSIBOXANES

[72] Inventors: Heinrich Marwitz; Siegfried Nitzsche, both of Burghausen, Upper Bavaria, Germany

[73] Assignee: Wacker-Chemie G.m.b.H., Munich, Bavaria, Germany

[22] Filed: July 9, 1970

[21] Appl. No.: 53,630

[52] U.S. Cl. ............ 260/33.4 SB, 260/31.2 R, 260/32.8 SB, 260/33.2 SB, 260/33.6 SB, 260/33.8 SB
[51] Int. Cl. .................................. C08g 51/34, C08g 51/28
[58] Field of Search ............... 260/32.8 SB, 33.2 SB, 33.4 SB, 260/33.6 SB, 46.5 E, 46.5 G, 33.8 SB; 117/155 R

[56] References Cited

UNITED STATES PATENTS

| | | | |
|---|---|---|---|
| 3,436,252 | 4/1969 | Neuroth | 260/32.8 SB X |
| 3,436,251 | 4/1969 | Rees | 117/155 |

*Primary Examiner*—Lewis T. Jacobs
*Attorney*—Robert F. Fleming, Jr., Laurence R. Hobey, Harry D. Dingman and Howard W. Hermann

[57] ABSTRACT

An abhesive or release coating for a variety of substrates, particularly paper, is prepared by admixing (1) a hydroxyl end-blocked diorganopolysiloxane, (2) a crosslinking alkoxysilane free of amino groups, (3) a crosslinking silane containing amino groups, (4) a tin compound as curing catalyst in (5) an organic solvent. The coating is applied to the substrate and can be cured in the absence of moisture.

9 Claims, No Drawings

ADHESIVE COATINGS COMPRISING POLYSIBOXANES

This invention relates to a novel release agent system for use on substrates which come into contact with sticky or tacky materials from which the substrate must later be removed. An organosilicon release agent is also the subject of this invention.

It has been known for many years that certain silicones (more properly identified as organosiloxane polymers) can be applied to the surface of paper, various films and other substrates to render the surface abhesive (i.e. non-adherent) to sticky and tacky materials (see, for example, British Pat. No. 1,111,156).

The present invention introduces a new and significantly superior silicone release agent for use on a wide variety of substrates and particularly useful in packaging foodstuffs. The composition employed as a release agent is a mixture of (1) an essentially linear, hydroxyl endblocked diorganosiloxane polymer, (2) a crosslinking alkoxysilane which is free of amino groups defined by the formula $RSi(OR')_3$ where R is a monovalent hydrocarbon radical and R' is any hydrocarbon or hydrocarbonoxyhydrocarbon radical or a partial hydrolyzate of such silanes, (3) a crosslinking amino substituted silicon compound, (4) a tin compound as curing catalyst, and (5) an organic solvent.

The release agents of this invention are superior to previously known release agents in that they will yield coatings which are more adherent to the substrates and are more resistant to removal by friction and abrasion. Furthermore, these release agents have little or no effect on the adhesive strength of adhesives stored in contact with them. Finally, these release agents are stable on storage, do not require to be mixed and stirred prior to or during use, cure on the substrate at a very rapid rate and do not require a long post-cure on the substrate. These advantages are realized to a surprising degree despite the absence of organosilicon compounds containing HSi and no water vapor is required to be added to the curing zone during the curing period.

The diorganopolysiloxanes having silicon bonded hydroxyl groups as endblocking units are known commercial materials. These polymers can be represented by the general formula $(HO)_x(R^2_y SiO_{4-y/2})_n H$ where $R^2$ is a hydrocarbyl or substituted hydrocarbyl radical, $x$ has an average value of 0.9 to 1.1 (preferably 0.99 to 1.01), $y$ has an average value of 1.9 to 2.1 (preferably 1.99 to 2.01), $x + y$ equals 3.0 and $n$ has an average value of at least 100. As can be seen from the average value for $y$, the preferred polymeric units are diorganosiloxane units ($R_2^2SiO$) but monoorganosiloxane units ($R^2SiO_{3/2}$) and triorganosiloxane units ($R_3^2SiO_{1/2}$) can be present in limited proportions.

The hydrocarbyl and substituted hydrocarbyl radicals represented by $R^2$ include alkyl radicals such as $CH_3$, $C_2H_5$ and $C_{18}H_{37}$; alkenyl radicals such as vinyl, allyl and octadecenyl, cycloaliphatic hydrocarbon radicals such as cyclohexyl, cyclononyl, cyclopentenyl and cyclohexenyl, aryl radicals such as phenyl and xenyl, and aromatic hydrocarbon radicals, as well as halogenated derivatives of the foregoing including chloromethyl, fluorophenyl, 3,3,3-trifluoropropyl and perchlorovinyl and cyanoalkyl radicals such as cyanopropyl. It is preferred that at least 50 percent of the $R^2$ groups by methyl radicals because of economic factors and availability. The $R^2$ radicals on any one silicon atom can be the same or different and the polymers can be homopolymers, copolymers or mixtures thereof with similar or different degrees of polymerization. Blends of polymers are often employed.

The adhesiveness of tacky materials in contact with the release coating of this invention can be protected or generally kept unaffected by employing α,ω-dihydroxysiloxane polymers having high viscosities above 100,000 cs. at 25° C. and preferably above 1,000,000 cs. at 25° C. (i.e. diorganosiloxane gums).

The second ingredient herein is a silane crosslinking agent defined by the formula $RSi(OR')_3$ or a partial hydrolyzate of such silane. In such silanes, R is a hydrocarbyl radical, preferably methyl or vinyl, but can be alkyl, aryl, alkenyl, alkaryl or aralkyl as these terms are generally used in the art. The R' radical includes hydrocarbyl and hydrocarbonoxyhydrocarbyl radicals as these terms are illustrated above and in the art. Preferably, R' is $—CH_3$, $—C_2H_5$, or $CH_3OC_2H_5—$. Examples of preferred silanes of the formula $RSi(OR')_3$ include $CH_3Si(OCH_2CH_2OCH_3)_3$, $CH_2 = CHSi(OCH_2CH_2OCH_3)_3$ and $CH_3Si(OC_2H_5)_3$. The first two silanes in the preceding listing produce rapid curing; hence, are particularly useful. Mixtures of alkoxysilanes of the general formula $RSi(OR')_3$ can be employed.

In order to obtain a rapid cure (a high curing rate) the alkoxysilanes of the formula $RSi(OR')_3$ can be employed in proportions of at least 1 part by weight per 100 parts by weight of the diorganopolysiloxane (1) [i.e. 1 percent by weight silane (2)]. Of course as larger proportions of crosslinking silane (2) are employed, a tighter cure (i.e. greater crosslinking) is achieved; hence, it is preferred to limit the amount of silane (2) to not more than 50 parts of said silane per 100 parts of siloxane polymer (1). The best results are achieved employing 20 to 30 parts by weight of silane (2) per 100 parts by weight of siloxane polymer (1).

The organosilicon compound containing amino groups employed as ingredient (3) herein and active as a crosslinking agent is preferably a silane of the general formula $R^4Si(OR^3)_3$ because with such aminosilanes (3) the release coating obtained cures rapidly and completely to form a highly tenacious, abrasion and friction resistant coating on the substrate. In the general formula, $R^3$ represents hydrocarbyl and substituted hydrocarbyl (e.g. halogenohydrocarbyl, cyanoalkyl and aminohydrocarbyl radicals) which can be the same or different in any one molecule and $R^4$ represents an SiC bonded monovalent hydrocarbon radical containing at least one amino group and, optionally, one or more oxygen atoms present as ether linkages (C—O—C) and other substituents. It is preferred that the radicals represented by $R^3$ be aliphatic and contain less than six carbon atoms as illustrated by $CH_3$, $C_2H_5$, n-propyl, isopropyl, $CH_3OC_2H_5—$ and beta-aminoethyl radicals.

The $R_4$ radical in crosslinker (3) can be aliphatic or aromatic but it is preferred that $R_4$ be aliphatic. It can, for example, contain any of the following groups: $—CNH_2$, $—CNHCH_2CH_2^{NH_2}$, $—COCH_2CH_2NH_2$ and combinations of such groups. Examples of the silanes (3) of the formula $R_4Si(OR^3)_3$ include gamma-aminopropyltrimethoxysilane, N-beta-aminoethyl-gamma-aminopropyltrimethoxysilane, N-beta-aminoethyl-delta-aminobutyltriethoxysilane, silanes of the formula $H_2NCH_2CH_2O(CH_2)_3Si(OC_2H_5)_3$, $H_2NCH_2CH_2O(CH_2)_3i(OCH_2CH_2NH_2)_3$ and aminomethyltrimethoxysilane, alpha-aminoethyltrimethoxysilane, and delta-aminobutyltriethoxysilane. Mixtures of silanes (3) of the formula $R^4Si(OR^3)_3$ can be employed.

In order to obtain a rapid rate of cure, the aminosilanes (3) are expediently used in amounts of at least 0.1 part by weight of said silane (3) per 100 parts by weight of the siloxane polymer (1) [i.e. at least 0.1 percent by weight silane (3)]. More than 5 parts of silane (3) per 100 parts siloxane (1), on a weight basis, may produce premature curing of the mixture and shorten shelf life and bath life during use. The best results are achieved with 0.5 to 2.0 parts by weight of the silane (3) of the formula $R^4Si(OR^3)_3$ per 100 parts by weight of the hydroxyl endblocked diorganosiloxane (1).

Good results have also been achieved employing as the aminosilicon crosslinker (3) an aminosilane of the general formula $R^2Si(NHR^5)$, where $R^2$ is as above defined and illustrated and $R^5$ is hydrocarbyl radical free of aliphatic unsaturation. Thus, $R^5$ can be any of the radicals representing $R^2$ except alkenyl radicals. Examples of $R^5$ include n-butyl, tert.-butyl, 3,5,5-trimethylcyclohexyl and 2,3,3-triethylcyclohexyl. Because of their ready availability and because they result in products which are physiologically unobjectionable, the $R^5$ radicals are preferably n-butyl and cyclohexyl. Where $R^5$ is a cyclohexyl radical, the release agents of this invention are particularly useful as release agents for packages containing sticky foodstuffs such as meats and sweets. Mixtures of silanes (3) of the general formula R²Si(NHR⁵)₃ or mixtures of the same or different silanes (3) of the formulae R²Si(NHR⁵)₃ and R⁴Si(OR³bq3 can be employed.

In order to get a faster rate of cure, the silanes (3) of the formula R²Si(NHR⁵)₃ are employed in proportions of at least 0.4 part by weight based on the 100 parts by weight of diorganopolysiloxane (1). When more than 10 parts of said silane (3) are present, on the stated basis, premature and undesired curing of the mixture (i.e. gelling) occurs. The best results are achieved with 1.0 to 1.5 parts be weight of silane (3) per 100 parts diorganopolysiloxane (1).

Preferably little or no compounds with HSi ≡ groups are present in the mixtures employed herein. Thus, during storage, the gradual evolution of hydrogen from the mixture will not occur. The diorganosiloxane polymer (1), silanes of the formula RSi(OR')₃ (2) or partial hydrolyzates thereof, and aminosilanes (3) are the only reactive organosilicon compounds present in the mixtures employed herein.

The compositions of this invention also contain a catalyst which is an organo tin compound such as those previously employed to prepare organosilicon release coatings and are well known as organosiloxane condensation catalysts. Examples of such tin compounds are well known and include diorganotinacrylate such as dibutyltindilaurate, dioctyltinmaleinate and dibutyltin-di-2-ethylhexoate. Preferably, the tin catalyst is employed in amounts of from 0.1 to 10 parts, preferably 1 to 5 parts by weight, of catalyst per 100 parts be weight of diorganopolysiloxane (1).

The materials employed herein are prepared by dissolving the diorganopolysiloxane (1), crosslinker alkoxy silane (2), aminosilicon crosslinker (3) and tin catalyst (4) in an organic solvent. The organic solvent should be water free insofar as is practically possible and should have no reactivity toward or undesirable effect on the compounds to be dissolved therein, at least at room temperature. The organic solvent should evaporate rapidly in the temperature range 70° to 200° C. Examples of suitable solvents include hydrocarbons such as benzine, e.g. alkane mixtures boiling in the range 80° to 180° C. at 760 mm. Hg. absolute, benzene, toluene and xylene; inert chlorohydrocarbons; ethers; esters; alcohols and ketones. Benzines are preferred for economic and availability reasons, and particularly if the amino compounds (3) are of the formula R⁴Si(OR³)₃ as defined above, in a mixture with oxygen containing organic solvents to extend the storage stability and pot life of the mixtures (i.e. the time between preparation of the mixture and noticeable gelling or curing within the mixture). Examples of such oxygen-containing solvents are alcohols, ketones and carboxylic acids. Mixtures of solvents can be used.

The organic solvent is used in proportions of from 200 to 500 parts be weight based on the weight of diorganopolysiloxane (1).

THe substrate material to be employed may not absorb or may absorb to only a limited degree the organic solvent systems described above. In this event, the materials of this invention are preferably employed in quantities of from 0.1 to 0.5 gram of organosilicon compounds per square meter of surface to be treated. However, when the substrate surface will absorb the solvent solution employed herein and described above, from 1 to 3 grams of organosilicon compound per square meter of surface is suggested to obtain the desired abhesiveness.

The organic solvent solution can be applied by any desired means such as dipping, brushing, pouring, spraying, rolling and flowing.

After the substrate is coated, it is best to heat it at 70° to 200° C., preferably 70° to 130° C., for rapid removal of solvent and to accelerate the cure. However, curing will occur at room temperature, if desired, (see, e.g., Example 3). For example, a good cure is obtained on a substrate which does not appreciably abosrb the absorb solvent solution system described and employed herein as follows:

At 70° C.—10 to 60 seconds

At 100° C.—5 to 30 seconds

At 120° C.—1 to 10 seconds

The release agent prepared and applied in accordance with the present invention adhere firmly to the substrate and resist friction and abrasion immediately after cure or at the latest 2 to 4 hours after the cure.

The compositions of this invention have many obvious uses as release agents. They can be used on substrates to prepare release coatings to release adhesive materials from a wide variety of substrates such as paper and paper products, synthetic foils, metals, ceramics and fabric, hence, they are suitable for use on parting, covering and running papers, cardboards and foils for covering the adhesive side of self-adhesive tapes and self-adhering foils, for lining packing materials such as paper and cardboard boxes, metal foils and fibers, for example, from cardboard, organic plastics, wood and iron or other metals, which are employed to store and transport adhesive foodstuffs such as honey, creams, cakes and other sweets, meat and other adhesive or sticky materials such as raw rubber and asphalt.

The following examples are included to assist in understanding and practicing this invention and do not restrict the scope of the invention. The invention is delineated in the claims. All parts and percentages are based on weight unless otherwise stated.

EXAMPLE 1

A solution of 5 parts of a dimethylpolysiloxane containing Si-bonded hydroxyl groups in the terminal units having a plasticity according to Brabender of 600 mkg in 88.1 parts of an alkane mixture with a boiling range of 80° to 110° C. at 760 mm. Hg. absolute was mixed with 5 parts n-butanol, 1.5 parts methyltris-beta-methoxyethoxysilane, 0.3 part dibutyltindilaurate and 0.1 part of N-beta-aminoethyl-gamma-aminopropyltrimethoxysilane. A parchment paper tape was run through this solution and the paper absorbed or took up about 0.4 gram organosilicon compounds per square meter. The tape was then conducted through a drying oven at a rate of 40 m. per minute in a continuous apparatus. The drying oven is 10 meters long and the air in the drying oven had a temperature of 120° C.

The coating was completely cured immediately after leaving the drying oven and had a superior resistance to removal by abrasion. The above coated parchment paper was used for covering self-adhesive foils and it showed excellent parting properties without affecting the shelf life of the adhesive foils.

EXAMPLE 2

A solution of 5 parts of a dimethylpolysiloxane containing 1 Si-bonded hydroxyl group in each terminal unit having a plasticity according to Brabender of 500 mkg in 87.65 parts of an alkane mixture with a boiling range of 80° to 110° C. at 760 mm. Hg. absolute was mixed with 5 parts of isopropanol, 1 part n-butanol, 1 part vinyltris-beta-methoxyethoxysilane, 0.25 part dioctyltinmaleinate and 0.1 part gamma-aminopropyltrimethoxysilane. In a continuous apparatus, a fiberglass tape was run through the solution thus obtained and the fiberglass absorbed about 0.15 grams organosilicon compounds per square meter and then was conducted through a drying oven at a rate of 7 m. per minute. The drying oven was 10 meters long and the air in the drying oven had a temperature of 75° C.

The coating exhibited good resistance to abrasion and was highly resistant to adhesive materials.

EXAMPLE 3

A solution of 10 parts of a dimethylpolysiloxane containing 1 Si-bonded hydroxyl group on each terminal unit, having a plasticity according to Brabender of 450 mkg in 80.3 parts of trichloroethylene was mixed with 7 parts n-butanol, 2 parts vinyltris-beta-methoxyethoxysilane, 0.5 part dibutyltindilaurate and 0.2 part of the compound of the formula $H_2NCH_2CH_2O(CH_2)_3i(OCH_2CH_2NH_2)_3$. With the help of a spray gun, the inner side of tin plate drums were coated with the solution thus obtained. Finally, a part of the drums was dried in the drying oven for 10 seconds at 120° C. and the remainder of the drums for 1 hour in the air at about 20° C.

The coating displayed good resistance to adhesion and abrasion and the drums were highly suitable as containers, for instance, for adhesives which can be in their pure form or in the form of solutions in organic solvents. The adhesives were not affected by storage by the coating on the inner side of the drums and could be removed from the drums very easily without leaving a residue in the drums.

EXAMPLE 4

A solution of 5 parts of a dimethylpolysiloxane containing 1 Si-bonded hydroxyl group on each terminal unit having a plasticity according to Brabender of 600 mkg in 93.825 parts of an alkane mixture having a boiling range of 80° to 110° C. at 760 mm. Hg. absolute was mixed with 0.5 part vinyltris-beta-methoxyethoxysilane, 0.075 part dioctyltinmaleinate and 0.6 part methyltriscyclohexylaminosilane. In a continuous apparatus, a parchment paper tape was run through the solution thus obtained and was then conducted through a drying oven at a rate of 40 m. per minute. The drying oven was 10 meters long and the air in the drying oven had a temperature of 120° C. After leaving the drying oven, the coating was free of cyclohexylamine radicals. The paper thus obtained met the requirements of the German Department of Health and was eminently suitable as a packing material for sticky foodstuffs.

That which is claimed is:

1. A silicone release agent consisting of (1) 100 parts by weight of hydroxyl endblocked, essentially linear diorganopolysiloxane of the general formula $(HO)_x(R^2_ySiO_{4-y/2})_n$ H where $R^2$ is selected from the group consisting of alkyl, alkenyl, cycloaliphatic, aromatic hydrocarbon, halogenated alkyl, halogenated alkenyl, halogenated cycloaliphatic, halogenated aromatic hydrocarbon and cyanoalkyl radicals, $x$ has an average value of 0.9 to 1.1, $y$ has an average value of 1.9 to 2.1, the sum of $x$ and $y$ is 3 and $n$ has an average value of at least 100, (2) 1 to 50 parts by weight of a crosslinking alkoxysilane free of amino groups and defined by the formula $RSi(OR')_3$ where R is a hydrocarbyl radical and R' is a hydrocarbyl or hydrocarbonoxyhydrocarbyl radical or a solvent soluble partial hydrolyzate of said alkoxysilane, (3) a crosslinking amino substituted silicon compound selected from the group consisting of (a) 0.1 to 5.0 parts by weight of a silane of the general formula $R^4Si(OR^3)_3$ where $R^4$ is an amino substituted hydrocarbyl group containing at least 1 amino substituent and bonded to silicon through a C—Si bonding or an amino substituted hydrocarbyl as so defined containing one or more oxygen atoms present as ether linkages and $R^3$ is an aliphatic hydrocarbyl radical of less than six carbon atoms and (b) 0.4 to 10 parts by weight of a crosslinking amino substituted silicon compound defined by the general formula $R^2Si(NHR^5)_3$ where $R^2$ is a hydrocarbyl or substituted hydrocarbyl radical free of aliphatic unsaturation and $R^5$ is a hydrocarbyl radical, (4) 0.1 to 10 parts by weight of an organo tin compound employed as a condensation catalyst and (5) 200 to 5,000 parts by weight of an organic solvent for ingredients (1) through (4), said solvent being inert to the ingredients, essentially water free and readily vaporized in the temperature range 70° to 200° C. at atmospheric pressure.

2. The release agent of claim 1 wherein the crosslinking agent (2) is $RSi(OR')_3$ where R is methyl or vinyl and R' is ethyl or methoxyethyl.

3. The release agent of claim 1 wherein the crosslinking agent (2) of the general formula $RSi(OR')_3$ is present in proportions of from 20 to 30 parts by weight.

4. The release agent of claim 1 wherein the diorganopolysiloxane (1) is a gum-like material having a viscosity exceeding 1,000,000 cs. at 25° C.

5. The release agent of claim 1 wherein the crosslinking amino containing silicon compounds (3) are defined by the formula $R^4Si(OR^3)_3$ where each $R^3$ is a hydrocarbyl or substituted hydrocarbyl radical and each $R^4$ is a hydrocarbyl radical bonded to silicon through Si—C bonding, containing at least one amino group or a hydrocarbonoxyhydrocarbyl radical containing at least one amino group and bonded to silicon through an Si—C bonding.

6. The release agent of claim 1 wherein the crosslinking amino containing silicon compounds are of the general formula $R^2Si(NHR^5)_3$ where $R^2$ is a hydrocarbyl or substituted hydrocarbyl radical and each $R^5$ is a hydrocarbyl radical.

7. The release agent of claim 1 wherein the tin catalyst is a diorganotindiacylate.

8. The release agent of claim 7 wherein the tin catalyst is dibutyltindilaurate, dioctyltindimaleinate or dibutyltin-di-2-ethylhexoate.

9. The release agent of claim 1 wherein the organic solvent is a hydrocarbon, halogenohydrocarbon, ether, ester, alcohol or ketone.

* * * * *